US009016257B2

(12) United States Patent
Griffiths et al.

(10) Patent No.: US 9,016,257 B2
(45) Date of Patent: Apr. 28, 2015

(54) CONTAINMENT ASSEMBLY FOR FLOWABLE MATERIALS

(71) Applicant: GM Global Technology Operations LLC, Detroit, MI (US)

(72) Inventors: Leonard Barry Griffiths, Fenton, MI (US); David R. Staley, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/717,119

(22) Filed: Dec. 17, 2012

(65) Prior Publication Data

US 2014/0165956 A1   Jun. 19, 2014

(51) Int. Cl.
*F02B 77/00* (2006.01)
*F01M 11/00* (2006.01)

(52) U.S. Cl.
CPC ...................... *F01M 11/00* (2013.01)

(58) Field of Classification Search
USPC .................. 123/196 R, 195 C, 195 R, 195 A; 184/106; 220/322; 403/288
See application file for complete search history.

(56) References Cited

U.S. PATENT DOCUMENTS

| | | | | | |
|---|---|---|---|---|---|
| 2,144,831 | A | * | 1/1939 | Burns | 192/107 R |
| 2,837,063 | A | * | 6/1958 | Martinez | 403/288 |
| 3,168,081 | A | * | 2/1965 | Bauer | 123/41.74 |
| 4,294,333 | A | * | 10/1981 | Little | 184/106 |
| 4,832,349 | A | * | 5/1989 | Kawai et al. | 277/591 |
| 5,074,428 | A | * | 12/1991 | Wildfeuer | 220/322 |
| 6,863,039 | B2 | | 3/2005 | Salameh | |
| 7,631,630 | B2 | * | 12/2009 | Sedlar et al. | 123/195 C |
| 2003/0024768 | A1 | * | 2/2003 | Jones | 184/1.5 |
| 2007/0249783 | A1 | * | 10/2007 | Miyamoto et al. | 524/607 |

FOREIGN PATENT DOCUMENTS

DE            3113912 A1    10/1982
DE     102008035465 A1     2/2010

OTHER PUBLICATIONS

DE Office Action for DE Application No. 102013113896.9 dated Sep. 8, 2014, 6 pages.

* cited by examiner

*Primary Examiner* — Marguerite McMahon
*Assistant Examiner* — James Kim
(74) *Attorney, Agent, or Firm* — Cantor Colburn LLP

(57) ABSTRACT

A combination usable together in an automotive vehicle includes an engine block, a cover, and a band clamp. The engine block includes an opening configured to provide access to an interior volume, a first flange having a periphery that surrounds the opening, and a first engagement surface disposed proximate the first flange. The cover includes a second flange disposed around a periphery of the cover, and a second engagement surface disposed proximate the second flange, the second engagement surface configured to mate with the first engagement surface, wherein when the first engagement surface and the second engagement surface are disposed in engagement with each other the first flange and the second flange in combination define an exterior surface having a first profile. The band clamp includes an interior surface with a second profile that is complementary with the first profile.

18 Claims, 4 Drawing Sheets

CONTAINMENT ASSEMBLY FOR FLOWABLE MATERIALS

FIELD OF THE INVENTION

The subject invention relates to a containment assembly for flowable materials, and more specifically to a clamp arrangement for securing an oil pan to an engine block where room temperature vulcanized rubber can be used to seal the joint between the pan and the block.

BACKGROUND

The automotive industry continues to strive for enhanced fuel efficiency in automotive vehicles, particularly automobiles, which has led to lighter vehicles or a drive to take intrinsic weight out of the vehicles. In an effort to accomplish this weight reduction, engine blocks have been made out of aluminum alloy, and oil pans have been made out of a composite polymeric material. The typical manner in which such composite oil pans are secured to the engine block involves a multitude of bolts that pass through molded-in holes in the pan and are bolted to corresponding tapped holes in the block. However, due to the different rates of thermal expansion between the metal of the block and the polymeric composite of the pan, lateral slippage between the pan and the block occurring during thermal cycling events remains a design challenge even with the use of a seal between the pan and the block.

Accordingly, it is desirable to provide a containment assembly for flowable materials, and more particularly a leak free containment assembly involving a composite oil pan assembled to an engine block, that overcomes the above noted lateral slippage challenges.

SUMMARY OF THE INVENTION

In one exemplary embodiment of the invention a combination usable together in an automotive vehicle includes an engine block, a cover, and a band clamp. The engine block includes an opening configured to provide access to an interior volume, a first flange having a periphery that surrounds the opening, and a first engagement surface disposed proximate the first flange. The cover includes a second flange disposed around a periphery of the cover, and a second engagement surface disposed proximate the second flange, the second engagement surface configured to mate with the first engagement surface, wherein when the first engagement surface and the second engagement surface are disposed in engagement with each other the first flange and the second flange in combination define an exterior surface having a first profile. The band clamp includes an interior surface with a second profile that is complementary with the first profile.

In another exemplary embodiment of the invention a containment assembly for flowable materials usable in an automotive vehicle includes an engine block, a cover, a band clamp, and a curable sealant. The engine block includes an opening configured to provide access to an interior volume, a first flange having a periphery that surrounds the opening, and a first engagement surface disposed proximate the first flange. The cover includes a second flange disposed around a periphery of the cover, and a second engagement surface disposed proximate the second flange, the second engagement surface configured to mate with the first engagement surface, wherein the first engagement surface and the second engagement surface are disposed in engagement with each other, wherein the first flange and the second flange in combination define an exterior surface having a first profile. The band clamp includes an interior surface with a second profile that is complementary with the first profile, wherein the interior surface of the band clamp is disposed in clamping arrangement with the exterior surface defined by the first and second flanges. The curable sealant is disposed between the first and second engagement surfaces.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
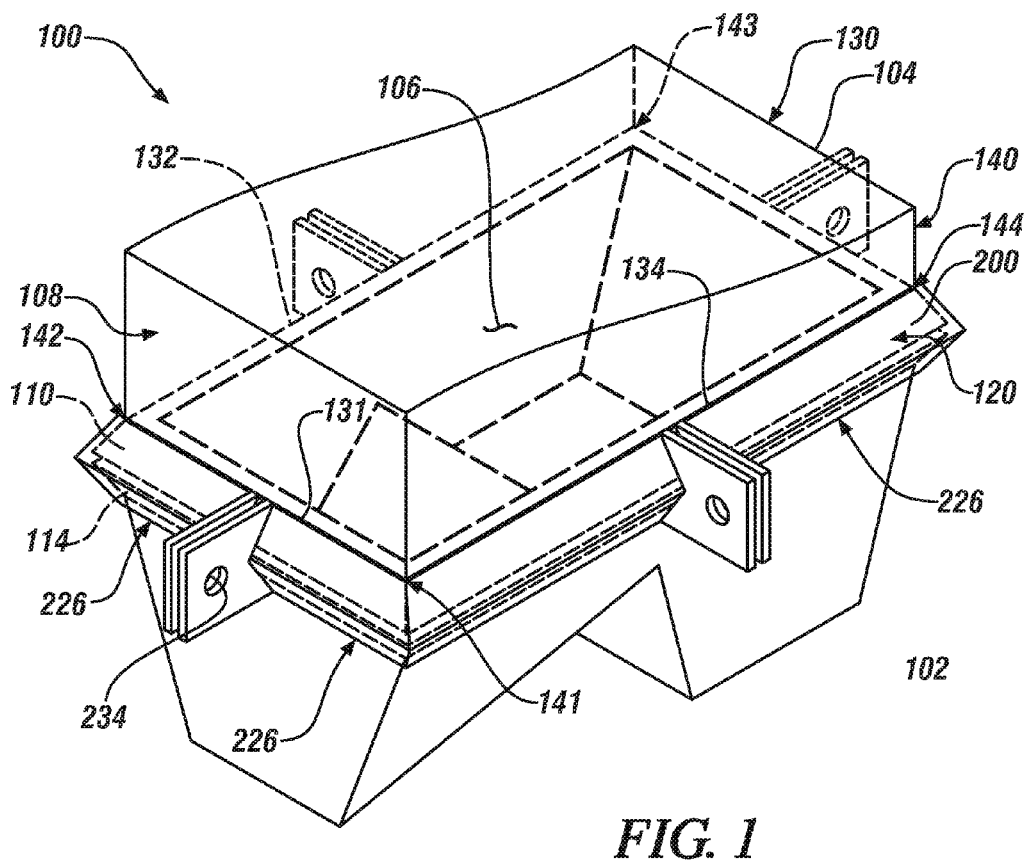
FIG. 1 depicts an isometric view of an oil pan secured to an engine block using a band clamp, in accordance with an embodiment of the invention.

The following description is merely exemplary in nature and is not intended to limit the present disclosure, its application or uses. It should be understood that throughout the drawings, corresponding reference numerals indicate like or corresponding parts and features.

Figure 2A:
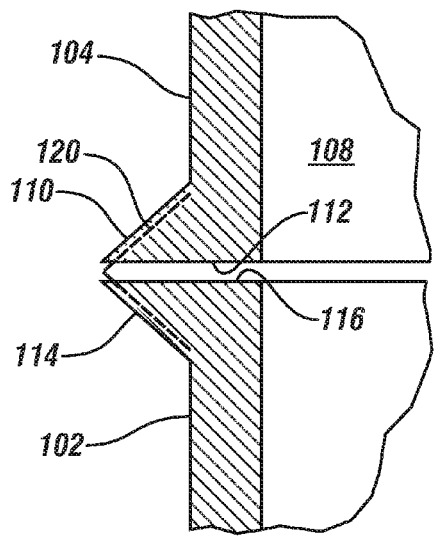
FIG. 2A depicts a cross section view of the two flanges and the mating interface between the oil pan and the engine block of FIG. 1, in accordance with an embodiment of the invention.

In accordance with an exemplary embodiment of the invention, and with reference to FIG. 1, a containment assembly 100 for flowable materials usable in an automotive vehicle includes an oil pan 102, more generally herein referred to as a cover 102, secured to the underside of an engine block 104 using a band clamp 200. An opening 106 accessible from an underside of the engine block 104 provides access to an interior volume 108 of the engine block 104 in which lubricating oil is present. The oil pan (cover) 102 serves to collect and retain the engine oil for reuse in the vehicle. The engine block 104 includes a first flange 110 having a periphery that surrounds the opening 106, and a first engagement surface 112, best seen with reference to FIG. 2A, disposed proximate the first flange 110. The cover 102 includes a second flange 114 disposed around a periphery of the cover 102, and a second engagement surface 116 disposed proximate the second flange 114. The second engagement surface 116 is configured and disposed to mate and engage with the first engagement surface 112 when the cover 102 is disposed in engagement with the engine block 104. As illustrated in FIG. 2A, the first flange 110 and the second flange 114 in combination define an exterior surface 120 (depicted in cross section by dashed lines) having a surface cross-section with a first profile (hereinafter referred to as a first profile) in the form of a V-shape. However, it will be appreciated that other shapes suitable for a purpose disclosed herein may be used for the first profile (herein referred to using reference numeral 120), such as a C-shaped profile (see 110', 114' in FIG. 2G, for example), a cove-shaped profile (see 110", 114" in FIG. 2H, for example), a bevel-edged profile (see 110''', 114''' in FIG. 2I, for example), or a combination thereof where the portions of surface 120 associated with the first flange 110 and the second flange 114 have different shapes, for example. Any and all profiles suitable for a purpose disclosed herein for first profile 120 are considered within the scope of the invention.

In an embodiment, the engine block 104 is made from a metal, such as aluminum alloy for example, the oil pan (cover) 102 is made from a glass-reinforced polyamide, such as a glass-reinforced nylon for example, and the band clamp 200 is made from a metal, such as 1020 or 1040 steel for example.

Figure 2B:
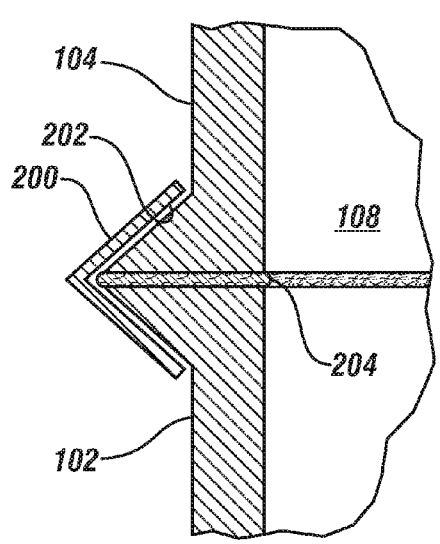
FIG. 2B depicts an alternative cross section view to that of FIG. 2A employing a curable sealant at the interface between the oil pan and the engine block, in accordance with an embodiment of the invention.

With reference to FIGS. 1 and 2B, the band clamp 200 has an interior surface 202 having a surface cross-section with a second profile (herein referred to using reference numeral 202) that is complementary with the first profile 120 defined by the first and second flanges 110, 114. While embodiments of the band clamp 200 are illustrated having squared off corners, it will be appreciated that this is for illustration purposes only, and that the scope of the invention also encompasses other corner profiles, such as a rounded corner having a 25 mm radius, for example. In an embodiment, the complementary profile of the second profile 202 is V-shaped when the first profile 120 is V-shaped, and is C-shaped when the first profile 120 is C-shaped. That is, the second profile 202 is complementary with the first profile 120 when they both have the same shape and the first profile 120 can nest within the second profile 202, advantageously providing surface-to-surface contact and uniform application of a clamping force by band clamp 200 against first and second flanges 110, 114. To secure the cover 102 to the engine block 104, the interior surface 202 of the band clamp 200 is disposed in clamping arrangement with the exterior surface 120 defined by the first and second flanges 110, 114. To prevent leakage of oil between the cover 102 and engine block 104, a seal 204 such as a curable sealant is disposed between the first and second engagement surfaces 112, 116. In an embodiment the seal 204 is a curable sealant such as room temperature vulcanizing rubber. However, other seals 204 are contemplated that may be suitable for a purpose disclosed herein, such as a partially cured pre-formed rubber gasket, an elastomeric bead in a groove (referred to as a void volume gasket), elastomeric beads on a metallic or composite substrate (referred to as a carrier-type gasket), for example. While seal 204 is illustrated in some but not all figures appended hereto, it will be appreciated that seal 204 may be utilized in all illustrated embodiments of the invention and that the absence thereof in any figure is merely for clarity of illustration.

Figure 2C:
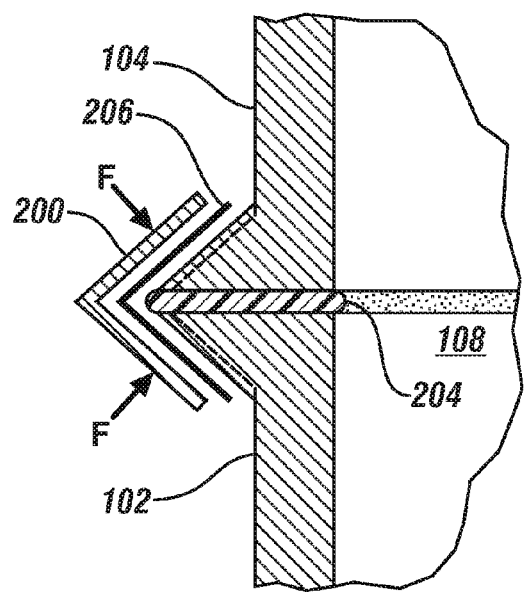
FIG. 2C depicts another alternative cross section view to that of FIG. 2A employing an elastomer layer between the band clamp and flange surfaces of the oil pan and engine block, in accordance with an embodiment of the invention.

Whether the forms of the first profile 120 and complementary second profile 202 are V-shaped or C-shaped, it will be appreciated by the geometry illustrated in FIGS. 2A, 2B and 2C that the "V" shape, or likewise the "C" shape, will facilitate production of a clamping force at the interface of the first and second engagement surfaces 112, 116 that will serve to bias the cover 102 toward the engine block 104 when the band clamp 200 is secured in place, as can be seen by the lines of force labeled "F" in FIG. 2C directed normal to the first and second profiles 120, 202.

With reference to FIG. 2C, an embodiment includes an elastomer layer 206 disposed between the interior surface 202 of the band clamp 200 and the exterior surface 120 defined by the first and second flanges 110, 114. In an embodiment, the elastomer layer 206 is disposed only at the corners of the engine block 104 and cover 102 where the band clamp 200 engages, which will be discussed in more detail below in connection with FIG. 3.

Figure 2D:
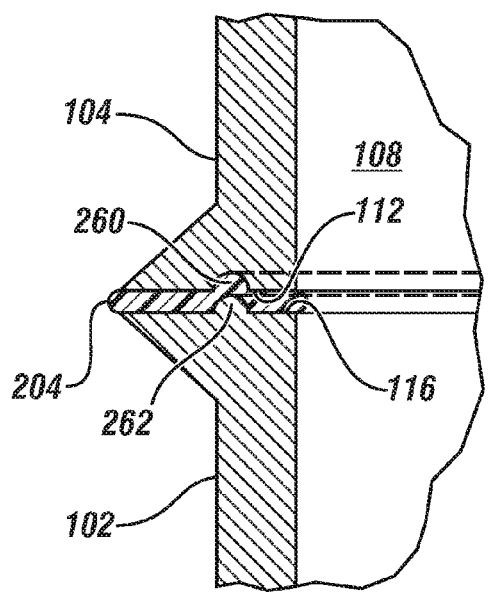
FIG. 2D depicts another alternative cross section view to that of FIG. 2A employing complementary mating features at the interface of the oil pan and engine block, in accordance with an embodiment of the invention.

With reference now to FIG. 2D, an embodiment includes an arrangement where the first engagement surface 112 is a planar surface having a first mating feature 260 formed thereon, and the second engagement surface 116 is a planar surface having a second mating feature 262 formed thereon, where the first and second mating features 260, 262 are complementary to each other and are configured to nest with one another. Such an arrangement not only provides a detent helpful in positioning the cover 102 relative to the engine block 104 during assembly thereof, but also provides an additional means of engaging the cover 102 to the engine block 104 to reduce lateral slippage therebetween. In an embodiment, the first mating feature is a recess and the second mating feature is a projection, as depicted in FIG. 2D. However, the arrangement of the mating features may be reversed, such that the first mating feature is a projection and the second mating feature is a recess, without detracting from the scope of the invention.

Figure 2E:
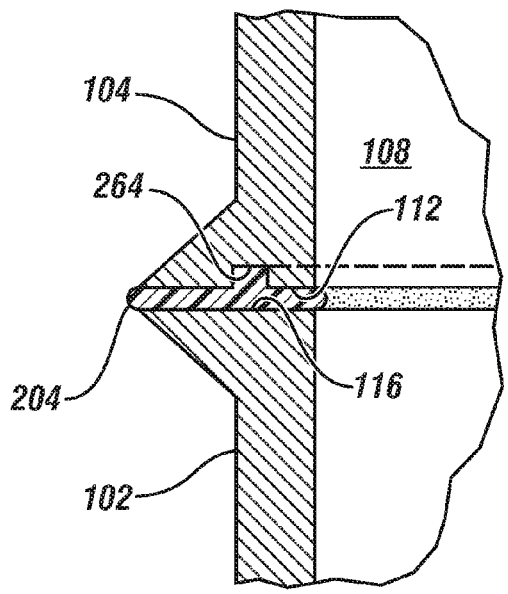
FIG. 2E depicts another alternative cross section view to that of FIG. 2A employing a recessed pocket on at least one surface at the interface of the oil pan and engine block, in accordance with an embodiment of the invention.

With reference now to FIG. 2E, an embodiment includes an arrangement where at least one of the first engagement surface 112 and the second engagement surface 116 includes a recess 264, which serves to provide a pocket for the curable sealant 204, or any other type of seal suitable for a purpose disclosed herein, to flow into or deform within, thereby forming a thicker region of curable sealant. By providing a thicker region of curable sealant 204 at the interface of the first and second engagement surfaces 112, 116, it is contemplated that improved resistance to lateral slippage between the cover 102 and the engine block 104 will result. It will be appreciated that the recess 264 may be on the first or the second engagement surface 112, 116.

Figure 2F:
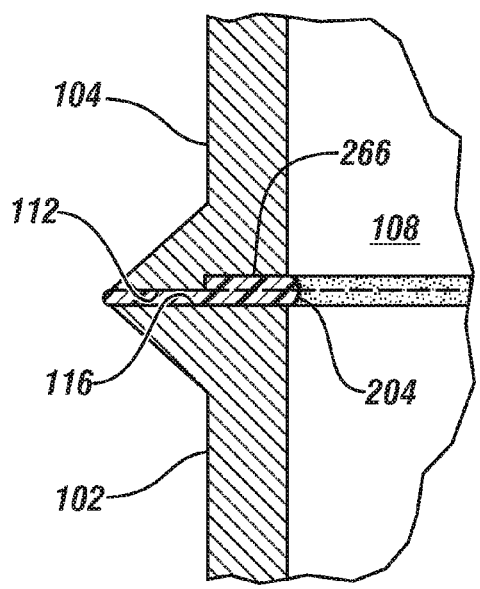
FIG. 2F depicts another alternative cross section view to that of FIG. 2A employing a stepped profile open to the inside of the engine block, in accordance with an embodiment of the invention.
Figure 2G:
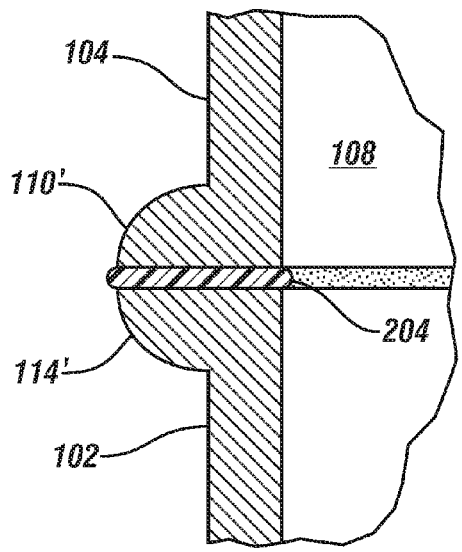
FIG. 2G depicts another alternative cross section view to that of FIG. 2A employing a C-shape on the two flanges, in accordance with an embodiment of the invention.
Figure 2H:
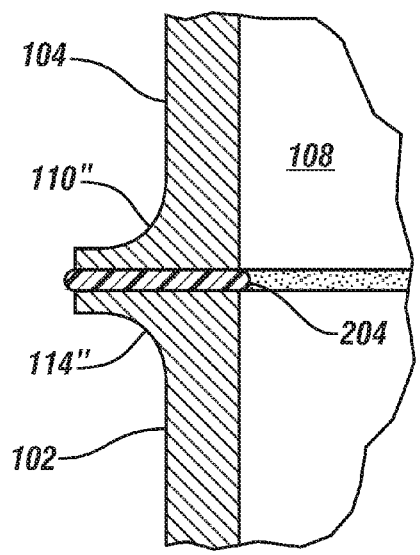
FIG. 2H depicts another alternative cross section view to that of FIG. 2A employing a cove-shape on the two flanges, in accordance with an embodiment of the invention.
Figure 2I:
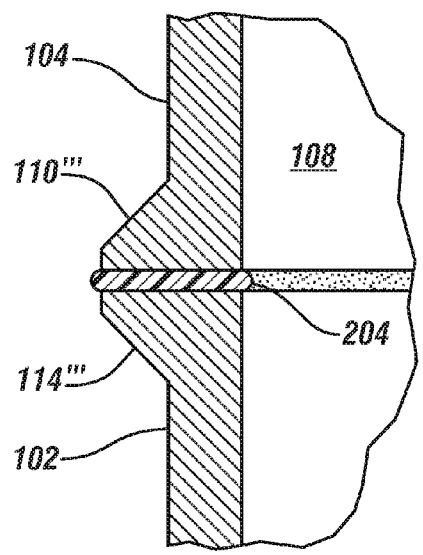
FIG. 2I depicts another alternative cross section view to that of FIG. 2A employing a bevel-edged-shape on the two flanges, in accordance with an embodiment of the invention.

With reference now to FIG. 2F, an embodiment includes another arrangement where at least one of the first engagement surface 112 and the second engagement surface 116 includes a stepped profile 266 that is open to the inside of the engine block 104, which serves to provide a recess for the curable sealant 204, or any other type of seal suitable for a purpose disclosed herein, to flow or deform within, thereby forming a thicker sealing region.

Figure 3:
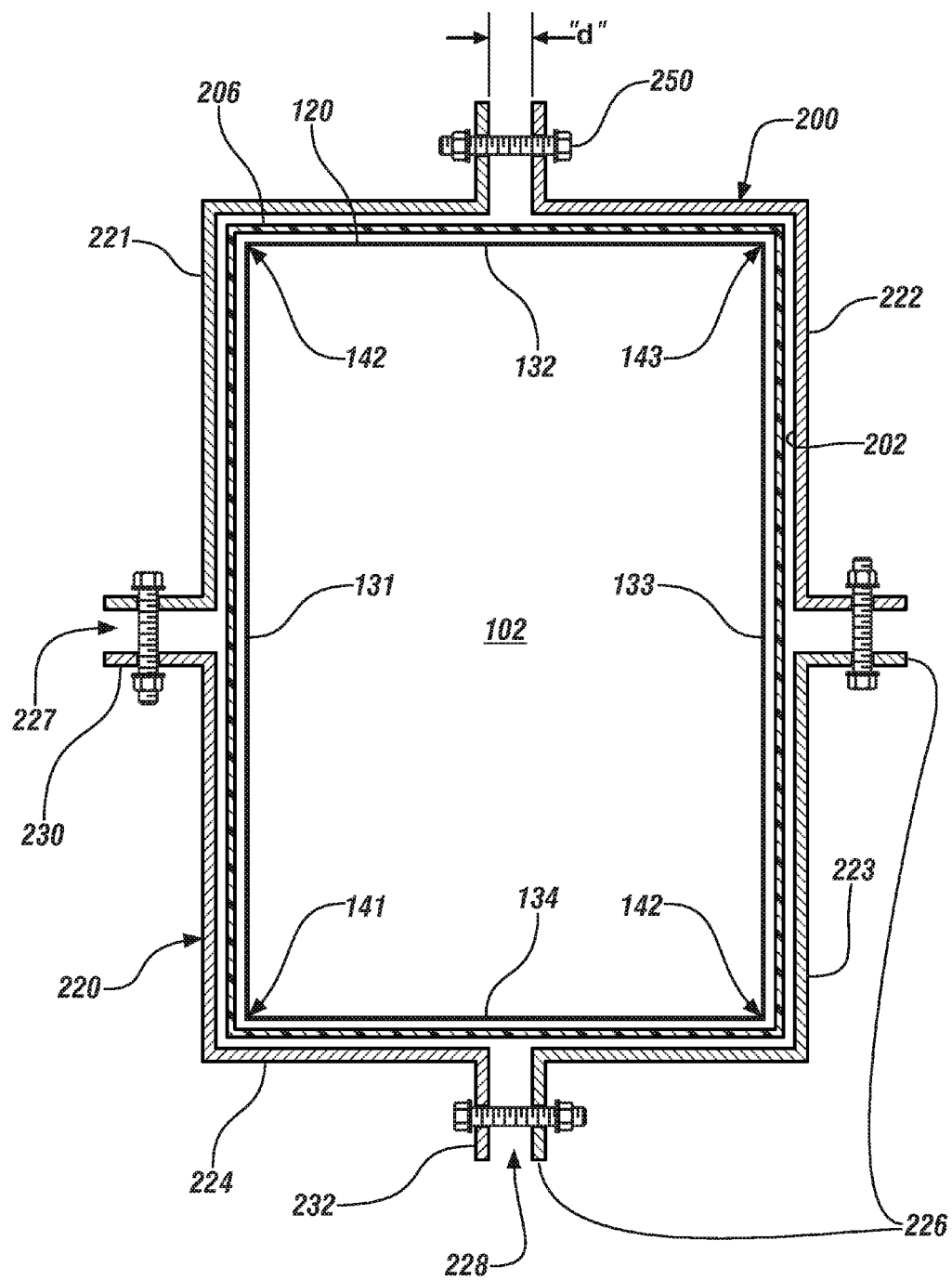
FIG. 3 depicts a bottom view of the oil pan and band clamp of FIG. 1 employing a segmented band clamp, in accordance with an embodiment of the invention.

Reference is now to FIG. 3 in combination with FIGS. 1, 2A, 2B and 2C, where FIG. 3 depicts a partially exploded assembly view of band clamp 200 and cover 102 prior to fasteners 250 being securely tightened, resulting in elastomer layer 206 appearing to be in an uncompressed state. An embodiment includes an arrangement where the band clamp 200 has a plurality of segments 221, 222, 223, 224 (referred to generally by reference numeral 220) arranged consecutively in a closed loop fashion (best seen with reference to FIG. 3). As used herein, the term closed loop fashion means an arrangement where a first end of a one segment is disposed adjacent a second end of another segment in a repeating manner until all segments are so disposed with their respective ends disposed next to each other. Each segment 220 includes a band portion 226 disposed between a first end 227 and an opposing second end 228. Each of the first and second ends 227, 228 have a respective attachment portion 230, 232. Each band portion 226 defines a portion of the interior surface 202 of the band clamp 200, where the interior surface 202 has the aforementioned second profile. As illustrated in FIGS. 1 and 3, the first profile 120 (best seen with reference to FIG. 2A) extends around the opening 106 of the engine block 104 and the outer perimeter of the cover 102 with a periphery having a shape of a polygon. While an embodiment of the invention is illustrated with a periphery of the first profile 120 forming a polygon shape in the form of four sides 131, 132, 133, 134 (collectively referred to by reference numeral 130) and four corners 141, 142, 143, 144 (collectively referred to by reference numeral 140), it will be appreciated that the scope of the invention is not so limited and encompasses any suitable shape of the periphery, including all manner of curved shapes, such as various rounded polygon shapes, and further including polygon shapes having any number of a plurality of associated sides and corners, such as a three-sided polygon or a five-sided polygon for example. As illustrated, each band portion 226 extends from one side to an adjacent side of the polygon, see reference numerals 226, 133 and 134 in FIG. 3 for example. Each segment 220 of the band clamp 200 is connected to an adjacent segment 220 using a fastener 250, such as a nut and bolt for example, which is inserted through corresponding holes 234 of adjacent attachment portions 230, 232 to secure the adjacent attachment portions 230, 232 of consecutive ones of the plurality of segments 221, 222, 223, 224 to each other.

As discussed above in connection with FIG. 2C, and with reference now to FIG. 3 in combination with FIG. 2C, an embodiment includes an elastomer layer 206 disposed between the interior surface 202 of the band clamp 200 and the exterior surface 120 defined by the first and second flanges 110, 114. In an embodiment, the elastomer layer 206 is disposed only at the corners of the polygon-shaped periphery of the first profile 120, as illustrated by solid lines in FIG. 3, which serves to facilitate the band clamp 200 in constraining the exterior surface 120 defined by the first and second flanges 110, 114 only at each corner of the polygon-shaped periphery when fasteners 250 are securely tightened. In another embodiment, the elastomer layer 206 is disposed around the entire perimeter of the polygon-shaped periphery of the first profile 120, as illustrated by solid lines plus dashed lines in FIG. 3, which serves to facilitate the band clamp 200 in constraining the exterior surface 120 at more than just the corners when fasteners 250 are securely tightened.

As illustrated in FIG. 3, an embodiment includes an arrangement where the adjacent attachment portions 230, 232 of consecutive ones of the plurality of segments 220 are at least partially spaced apart from each other a distance "d", which serves to facilitate tightening of the band clamp 200 as the fasteners 250 are tightened. As used herein, the term "at least partially spaced apart" is intended to encompass an arrangement where parts of adjacent attachment portions do not touch, and where each attachment portion undergoes deformation due to the tightening of the respective fastener resulting in closure of gap "d" at the outermost protruding part of the adjacent attachment portions.

From the foregoing it will be appreciated that some embodiments of the invention disclosed herein may provide one or more of the following advantages: a band clamp for clamping a composite oil pan to a metal engine block having reduced lateral slippage at the clamp joint as compared to a clamping arrangement using bolts to secure the pan to the block; a substantial reduction, if not elimination, of localized stress at the clamped region of the oil pan by replacing clamping bolts with a band clamp; improved moldability of a composite oil pan due to the absence of molded-in bolt holes for mounting the pan to the block; and, ease of serviceability during removal/replacement of the oil pan due to the absence of a multitude of bolts holding the pan to the block.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A combination usable together in an automotive vehicle, comprising:
   an engine block includes an opening configured to provide access to an interior volume, a first flange having a periphery that surrounds the opening, and a first engagement surface disposed proximate the first flange;
   a cover having a second flange disposed around a periphery of the cover, and a second engagement surface disposed proximate the second flange, the second engagement surface configured to mate with the first engagement surface, wherein when the first engagement surface and the second engagement surface are disposed in engagement with each other, the first flange and the second flange in combination define an exterior surface having a first profile, the first profile having a periphery having a plurality of associated sides and corners; and
   a band clamp having an interior surface with a second profile that is complementary with the first profile, the band clamp having a plurality of individual segments equal in number to a number of the corners of the first profile, each segment of the plurality of individual segments arranged consecutively in a closed loop fashion around the first profile beginning at one side, continuing around an associated corner, and terminating at an adjacent side of the first profile.

2. The combination of claim 1, wherein:
   the second engagement surface of the cover is disposed adjacent the first engagement surface of the engine block, and the interior surface of the band clamp is disposed in clamping arrangement with the exterior surface defined by the first and second flanges; and
   further comprising a seal disposed between the first and second engagement surfaces.

3. The combination of claim 2, wherein:
   the seal is a curable sealant.

4. The combination of claim 2, wherein:
each segment of the plurality of segments of the band clamp having a band portion with a first end and an opposing second end, the first and second ends each having an attachment portion, each band portion defining a portion of the interior surface with the second profile; and
further comprising a plurality of fasteners, each fastener disposed to secure adjacent attachment portions of consecutive ones of the plurality of segments.

5. The combination of claim 2, wherein:
the first and second complementary profiles are configured to produce a clamping force that biases the cover toward the engine block.

6. The combination of claim 1, wherein:
the first profile extends around the opening of the engine block with a periphery having a shape of a polygon; and
the exterior surface defined by the first and second flanges is constrained by the band clamp at each corner of the polygon-shaped periphery.

7. The combination of claim 1, wherein:
the first and second complementary profiles are V-shaped, C-shaped, cove-shaped, bevel-edge-shaped, or any combination thereof.

8. The combination of claim 4, wherein:
the first profile extends around the opening of the engine block with a periphery having a shape of a polygon; and
each band portion extends from one side to an adjacent side of the polygon.

9. The combination of claim 8, wherein:
the polygon is a four-sided polygon; and
the plurality of segments is four segments.

10. The combination of claim 1, wherein:
the engine block is made from a metal;
the cover is made from a glass reinforced polyamide; and
the band clamp is made from a metal.

11. The combination of claim 4, wherein:
the adjacent attachment portions of consecutive ones of the plurality of segments are at least partially spaced apart from each other.

12. The combination of claim 2, further comprising:
an elastomer layer disposed between the interior surface of the band clamp and the exterior surface defined by the first and second flanges.

13. The combination of claim 1, wherein:
the first engagement surface comprises a planar surface having a first mating feature; and
the second engagement surface comprises a planar surface having a second mating feature that is complementary with the first mating feature.

14. The combination of claim 13, wherein:
the first mating feature is one of a projection and a recess; and
the second mating feature is a complementary one of the projection and the recess.

15. The combination of claim 3, wherein:
at least one of the first engagement surface and the second engagement surface comprises a recessed region; and
the curable sealant is disposed within the recessed region.

16. A containment assembly for flowable materials usable in an automotive vehicle, comprising:
an engine block includes an opening configured to provide access to an interior volume, a first flange having a periphery that surrounds the opening, and a first engagement surface disposed proximate the first flange;
a cover having a second flange disposed around a periphery of the cover, and a second engagement surface disposed proximate the second flange, the second engagement surface configured to mate with the first engagement surface, wherein the first engagement surface and the second engagement surface are disposed in engagement with each other, wherein the first flange and the second flange in combination define an exterior surface having a first profile, the first profile having a periphery having a plurality of associated sides and corners; and
a band clamp having an interior surface with a second profile that is complementary with the first profile, the band clamp having a plurality of individual segments equal in number to a number of the corners of the first profile, each segment of the plurality of individual segments arranged consecutively in a closed loop fashion around the first profile beginning at one side, continuing around an associated corner, and terminating at an adjacent side of the first profile, wherein the interior surface of the band clamp is disposed in clamping arrangement with the exterior surface defined by the first and second flanges; and
a curable sealant disposed between the first and second engagement surfaces.

17. The oil containment assembly of claim 16, wherein:
each segment of the plurality of segments of the band clamp having a band portion with a first end and an opposing second end, the first and second ends each having an attachment portion, each band portion defining a portion of the interior surface with the second profile;
the first profile extends around the opening of the engine block with a periphery having a shape of a polygon;
each band portion extends from one side to an adjacent side of the polygon; and
further comprising a plurality of fasteners, each fastener disposed to secure adjacent attachment portions of consecutive ones of the plurality of segments.

18. The oil containment assembly of claim 17, wherein:
the cover is made from a glass reinforced polyamide.

* * * * *